Sept. 30, 1947.    O. J. POUPITCH    2,428,338

SPRING CLIP

Filed March 26, 1945

INVENTOR.
Ougljesa J. Poupitch
BY
Loftus, Moore, Olson & Trexler
Attys.

Patented Sept. 30, 1947

2,428,338

UNITED STATES PATENT OFFICE 2,428,338

SPRING CLIP

Ougljesa Jules Poupitch, Chicago, Ill., assignor to Illinois Tool Works, Chicago, Ill., a corporation of Illinois Application March 26, 1945, Serial No. 584,810

2 Claims. (Cl. 24—73)

This invention relates generally to spring fastening clips and more particularly to fastening clips adapted to be snapped into an aperture of a supporting work piece for securing a part such as molding strips and the like to said supporting part.

The invention contemplates a very simple and inexpensive push-in type spring fastener or clip adapted to be stamped and formed from sheet metal stock. To this end the invention contemplates a clip or fastener having a self-locking or latching shank or stud of novel and practical construction.

More specifically it is an object of the present invention to provide a spring fastener device of the type referred to above wherein the work latching or locking stud, adapted to be forced or pressed into the aperture of a work part, is formed integral with a fastener head at one extremity and is free at its opposite extremity so as to render the stud efficiently resilient for locking purposes.

It is a further object of the present invention to provide a spring clip adapted to be inserted within a work aperture, said clip incorporating a sheet metal head and a resilient stud equipped with a lateral work locking shoulder and comprising a V-shaped strip extending from the clamping side of the head and bent back upon itself to provide a free extremity capable of being shifted or sprung transversely of the stud axis as an incident to the insertion of the stud within a work aperture whereby the free end, when under lateral stress, will serve to resiliently maintain the shoulder in locking association with the apertured work piece.

It is also an object of the present invention to provide a relatively inexpensive yet efficiently operable fastener of the type referred to above which is particularly adapted for use in securing molding trim and the like in position upon a supporting work piece and to this end it is proposed to provide the clip with a head especially designed to resiliently grip the inner surface of hollow molding trim members.

The foregoing and other objects and advantages will be apparent when considered in connection with the accompanying drawing wherein.

Figure 1:
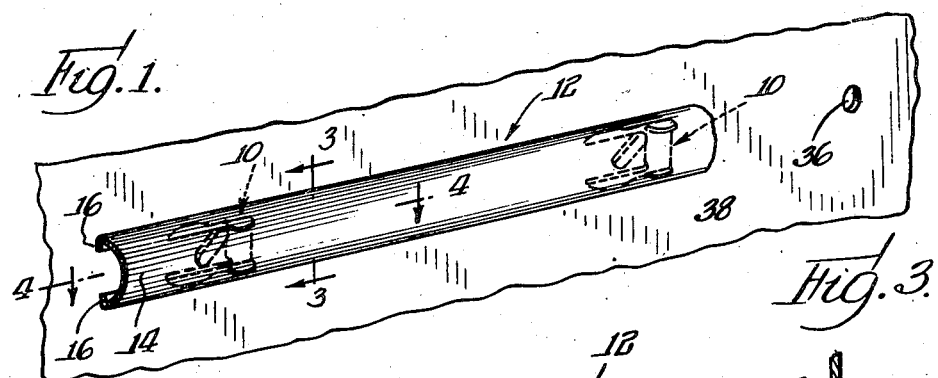
Fig. 1 is a perspective view of a molding strip mounted upon a supporting work part by means of clips or fasteners of the type contemplated hereby.
Figure 2:
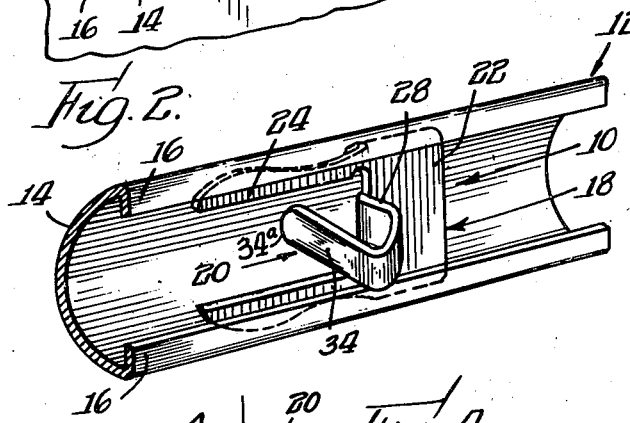
Fig. 2 is an enlarged perspective view of the rear side of the molding member and associated clip shown in Fig. 1 to more clearly illustrate the structural arrangement of the clip or fastener, and the manner in which it is supported within the molding member.
Figure 3:
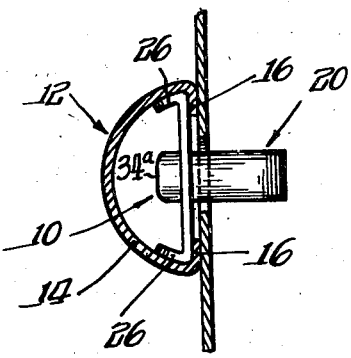
Fig. 3 is an enlarged transverse sectional view taken substantially along the line 3—3 of Fig. 1.
Figure 4:
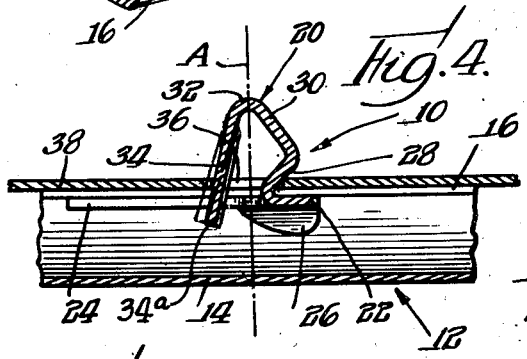
Fig. 4 is an enlarged horizontal sectional view taken substantially along the line 4—4 of Fig. 1.
Figure 5:
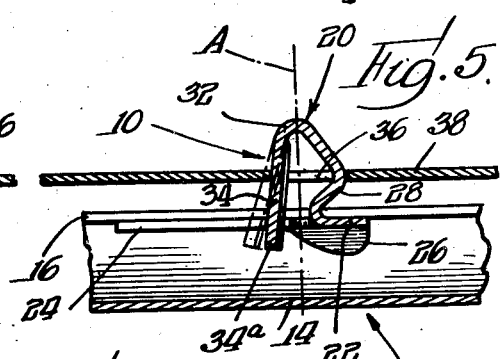
Figure 6:
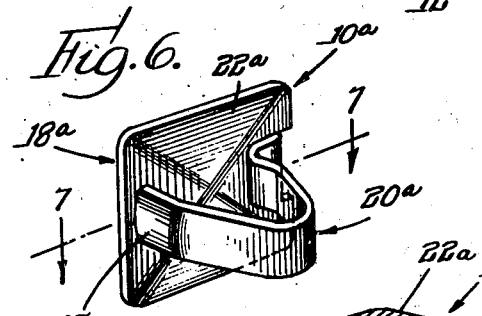
Figures 8, 9:
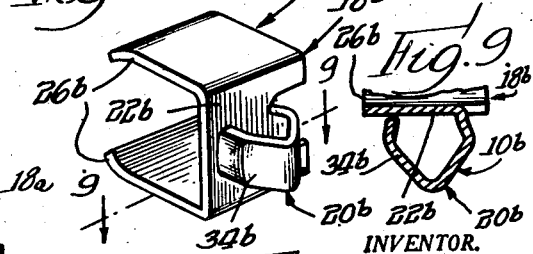
Figure 7:
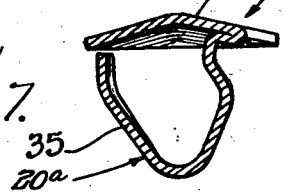

Fig. 5 is a sectional view similar to Fig. 4 showing the stud of the fastener clip during its initial insertion within the work aperture to more clearly illustrate the manner in which the free extremity of the fastener stud is laterally stressed as an incident to the insertion thereof within the work aperture, the dot and dash lines indicating the normal position occupied by the free extremity of the stud;

Fig. 6 is a perspective view illustrating a slightly modified clip;

Fig. 7 is a horizontal sectional view taken substantially along the line 7—7 of Fig. 6;

Fig. 8 is a perspective view of another modified form of slip; and

Fig. 9 is a horizontal sectional view taken substantially along the line 9—9 of Fig. 8.

Referring now to the drawing more in detail where like numerals have been employed to designate similar parts throughout the various views it will be seen that the invention contemplates a spring clip or fastening device designated generally by the numeral 10 as shown in Figures 1-5 inclusive. This clip 10 is particularly designed to be received by a channel-like or hollow molding strip 12. It will be noted that the molding strip 12 has an arcuate body portion 14 and oppositely disposed marginal flanges 16. The design or shape of the molding strip employed varies greatly and is dependent upon the ornamental effect and trim which is desired. For purposes of illustrating one practical application of the invention the spring fastener clip 10 has been shown in association with an arcuate form of molding strip.

The clip or fastener 10 is preferably made from sheet metal and includes a base or head portion 18 and a resilient locking stud portion 20 extending outwardly from and formed integral with the head 18. The head 18 of the fastener 10 is designed primarily for use with a molding strip and as such includes a main body portion 22 and a pair of spaced resilient arms 24 formed integral with and extending from the body 22 in substantial parallelism and providing a recess therebetween. The arms 24 are spaced so that in order to insert them longitudinally within the channel of the molding strip they will be forced inwardly and thus exert pressure against the inner wall of the molding strip. This frictional gripping of the arms against the inner wall of the molding strip makes it possible to adjustably position the clip at any desired location along the molding strip. Opposite margins of the body portion 22 are provided with flanges or ears 26 which are designed to snugly engage the inner surface or arcuate wall of the molding strip body 14. Thus the flanges 26 cooperate with the spring arms 24 in properly positioning the clip 10 within the molding strip so that the shank portion 20 of the strip always extends normal to the plane which includes the flanges 26. It will also be noted that the free extremities of the yieldable arms 24 are rounded to facilitate initial insertion thereof within the molding strip.

Attention is now directed to the structure of the resilient locking stud 20. This stud 20 comprises a V-shaped strip formed integral with and extending laterally of the body 22 of head 18 and including leg sections 30, 34. The portion of the stud in the immediate vicinity of the head is deflected so as to provide a work locking shoulder 28. This shoulder is formed by slightly bending the strip so that the material thereof makes an acute angle with the plane of the body 22. The strip is then bent in the opposite direction so as to provide the leg section 30. The strip is then bent back upon itself at the point 32 so as to provide the leg section 34 capable of being resiliently urged laterally with respect to the shank axis, said axis being designated by the dot and dash line A of Figs. 4 and 5 which line A is substantially normal to the plane of the head 22 and passes through the apex 32 so that the leg section 34 is disposed at an acute angle with respect to the line A. The leg section 34 has a free and unsecured end 34a and is preferably made arcuate in cross-section so as to lend strength to this portion of the shank, although it is otherwise substantially straight from the apex 32 to the free end thereof.

In Fig. 5 the fastener is disclosed in the position which it occupies during its initial insertion within the aperture 36 of a supporting work piece 38. The dot and dash lines indicate the position normally assumed by the free end 34a of the leg section 34 of the stud prior to its application to the work part. It will thus be apparent that as the stud is pushed through the aperture 36 the leg section 34 is resiliently forced toward the other leg section 30 of the stud strip. In Fig. 4 the fastener occupies its final position at which time the leg section 34 serves to firmly and resiliently urge the shoulder 28 into work locking position. That is to say, the lateral shifting of the free end of the leg section 34 of the stud under stress causes the shoulder 28 to be firmly maintained in locking association with the work part 38. In this position the fastener 10 cooperates in securing the molding strip 12 against the outer surface of the work part 38. It is to be further noted that removal of the clip from its applied position is greatly facilitated by the angular disposition of the leg section 34 which is substantially straight throughout its length so as to offer no shoulders which might tend to become engaged with the work part and result in deformation of the clip during removal.

In the disclosed embodiment of the invention the leg section 34 per se is substantially straight and relatively rigid and the entering apex 32 of the stud provides a resilient hinge about which the leg section 34 swings. That is to say, the entering apex 32 of the stud supplies the resiliency essential to the functioning of the leg section 34 in its final position of attachment as illustrated in Fig. 4. In this position the lateral stressing of the section or arm 34 causes the work part 38 in the vicinity of the aperture 36 to be firmly interlocked with the notch provided between the shoulder 28 of the leg section 30 and the base 22 of the head. By constructing the stud with an arm or leg such as the section 34 which is shiftable transversely with respect to the stud axis A the fastener 10 is rendered functionally adaptable for various thicknesses of stock. In other words since the free end of the leg section 34 extends entirely through the aperture 36 and through the plane of the head 22, this free end will not spring out as various thicknesses of stock within the range of the size of the notch or indentation presented by the shoulder 28 and the base 22 are accommodated by a given size of fastener. Likewise various sizes of apertures in the work part may also be accommodated depending of course upon the extent of shifting or flexing which is experienced by the leg section 34. While this shiftable section 34 in the disclosed embodiment is relatively rigid, it will be apparent that sections less rigid and varying in shape may be employed without departing from the spirit and scope of the present invention.

In Figs. 6 and 7, the application of the fastener principle heretofore described, as illustrated with modified head structures. In Fig. 6 a fastener designated generally by the numeral 10a is disclosed wherein a stud 20a corresponding structurally with the stud 20 extends laterally from a head 18a which comprises a base plate 22a. It will be noted that the stud 20a has a shiftable free extremity 35 which functions similarly to the shiftable leg section 34 previously described. The base plate 22a of the fastener 10a differs from the base 22 in that it extends beneath the end of the shiftable section 35. Thus the base or plate 22a provides a button-type head which may be of an ornamental nature, as distinguished from the head 18 which is particularly designed for use with molding strips.

In Figs. 8 and 9 a fastener designated generally by the numeral 10b is disclosed. This fastener 10b has a locking stud 20b provided with a shiftable stud section 34b. A head 18b comprises a base plate 22b and resilient gripping arms 26b. These arms 26b may be employed to resiliently grip an element therebetween. Except for the construction of the head 18b, the fastener 10b is similar to the fastener 10a. Obviously the novel resilient shank or stud construction disclosed herein may be employed with various types of head structures depending upon the use for which the fastener is intended. The invention has a wide range of applications and uses for securing members to apertured work parts.

It will be apparent from the foregoing that the invention contemplates a spring clip or fastener device of extremely simple construction capable of being produced by practising conventional stamping and forming methods. It will also be clear that the novel arrangement of the shank or stud portion of the fastener makes for firmness and ease of attachment. Likewise this novel structural design of stud makes it possible to employ a given spring fastener for work pieces of varying thicknesses having apertures of varying sizes. While certain specific embodiments have been disclosed herein, it will be apparent that the invention is by no means limited to the

I claim:

1. A sheet metal spring clip adapted to be applied to an aperture in a supporting work part and including a head having spaced portions providing a recess therebetween and adapted to be applied against one side of the work part, and a stud portion in the form of a substantially V-shaped strip extending outwardly from the plane of said head and adapted for insertion in the aperture of the work part, one end of the V-shaped strip being connected to said head and provided adjacent said connection with a shoulder adapted for interlocking engagement with the apertured work part and the other end of the V-shaped strip being substantially straight and extending into the recess between said spaced portions and adapted to resiliently urge said shoulder into interlocking relation with a work piece incident to the insertion of said stud portion into the work aperture.

2. A sheet metal spring clip adapted for ready removal from its applied position in an aperture in a supporting work part and comprising a head adapted to be applied against one side of the work part, and a stud portion in the form of a substantially V-shaped strip extending outwardly from the plane of the head and adapted for insertion in the aperture in the work part, one end of the V-shaped strip being connected to said head and extending at an acute angle relative thereto to provide a shoulder adapted for interlocking engagement with the aperture in the work part and said strip having a reverse bend extending outwardly to an apex spaced laterally of the connection between said strip and said head, the other end of the V-shaped strip being substantially straight throughout its length and disposed at an acute angle with respect to a line normal to the plane of the head and passing through the apex of said strip and with the free end thereof adapted to extend at least into the plane of said head for resiliently urging said shoulder into interlocking relation with a work piece and facilitating removal of the clip from the work aperture when desired.

OUGLJESA JULES POUPITCH.

REFERENCES CITED

The following references are of record in the file of this patent:

UNITED STATES PATENTS

| Number | Name | Date |
| --- | --- | --- |
| 2,144,171 | Van Uum | Jan. 17, 1939 |
| 2,283,151 | Van Uum | May 12, 1942 |
| 2,221,124 | Wiley | Nov. 12, 1940 |